United States Patent Office 2,743,278
Patented Apr. 24, 1956

2,743,278
RHODANINE COMPOUNDS

Edward B. Knott, Harrow, England, assignor to Eastman Kodak Company, Rochester, N. Y., a corporation of New Jersey No Drawing. Application October 1, 1953, Serial No. 383,690

11 Claims. (Cl. 260—306.7)

This invention relates to rhodanine compounds and methods for making them. More particularly, this invention relates to rhodanine compounds containing an extracyclic carbonyl group and to certain merocyanine dyes obtained from these rhodanine compounds.

The new rhodanine compounds of my invention can advantageously be represented by the following general formula:

I
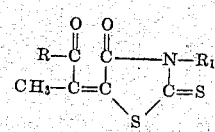

wherein R represents a methyl group or an alkoxyl group, such as methoxyl, ethoxyl, propoxyl, isopropoxyl, butoxyl, isobutoxyl, etc. (e. g. an alkoxyl group containing from 1 to 4 carbon atoms) and $R_1$ represents an alkyl group, such as methyl, ethyl, propyl, isopropyl, butyl, isobutyl, carboxymethyl, carbomethoxymethyl, carboethoxymethyl, carbopropoxymethyl, carbobutoxymethyl, allyl (vinylmethyl), benzyl (phenylmethyl), etc. (e. g. an alkyl group containing from 1 to 7 carbon atoms).

The compounds represented by Formula I can advantageously be prepared by condensing together a rhodanine compound selected from those represented by the following general formula:

II
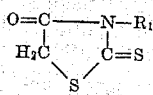

wherein $R_1$ has the values given above, with a compound selected from those represented by the following general formula:

III
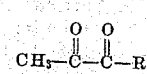

wherein R has the values given above. The condensations of the compounds of Formula II with those of Formula III are carried out in the presence of zinc chloride as catalyst and under substantially anhydrous conditions. The compounds wherein R represents an alkoxy group can advantageously be prepared by condensing the compounds of Formula II with those of Formula III, wherein R represents an hydroxyl group (i. e. pyruvic acid), in the presence of an alcohol. Under these conditions, the alcohol esterifies the carboxyl group of the pyruvic acid and the compounds of Formula I wherein R represents an alkoxy group are obtained. The compounds of Formula I wherein R represents an hydroxyl group can be obtained by omitting the alcohol from the condensation of the compounds of Formula II with pyruvic acid.

Heat accelerates the condensations described above and to avoid an unduly long reaction time it is advisable to carry out the reaction at 90–100° C. Advantageously, I have found that an inert solvent such as 1,4-dioxan, diethyl ether, etc., can be employed in the condensations.

The compounds of Formula I wherein $R_1$ represents a carbalkoxymethyl group can advantageously be prepared by heating together a compound selected from those of Formula II wherein $R_1$ represents a carboxymethyl group and a compound selected from those represented by Formula III in the presence of an alcohol. Under these conditions, the carboxymethyl group is transformed into a carbalkoxymethyl group through the process of esterification. The following examples will serve to illustrate more fully the manner whereby the compounds of Formula I can be obtained in accordance with my invention.

*Example 1.—4-(butan-3-on-2-ylidene)-3-carbethoxymethyl-2-thiothiazolid-4-one*

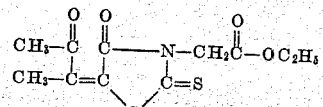

3 - carbethoxymethylrhodanine (4.4 g.), diacetyl (1.8 cc.), anhydrous, powdered zinc chloride (5.4 g.) and dioxan (10 cc.) were heated for 5 hours on the steam bath. Water was added to precipitate a yellow oil which partly solidified. It was collected, slurried in ethanol, filtered off and washed with isopropanol. It (1.8 g.; 31.5%) formed long, yellow needles, M. P. 111° C., from ethanol.

*Example 2.—5-(butan-3-on-2-ylidene)-3-carboxymethyl-2-thiothiazolid-4-one*

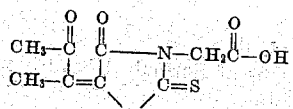

(a) 3-carboxymethylrhodanine (7.65 g.), diacetyl (3.6 cc.), powdered, anhydrous zinc chloride (10.8 g.) and n-butanol (20 cc.) were heated on a steam bath for 5 hours. Some crystallization occurred. Water (10 cc.) was added, the mixture shaken and the crystals (3.9 g., 37.5%) collected. It formed fine, yellow needles, M. P. 207° C., from methanol.

(b) As for (a) but using dioxan as solvent it was obtained in 77.5% yield.

*Example 3.—5-(butan-3-on-2-ylidene)-3-carbo-n-butoxymethyl-2-thiothiazolid-4-one*

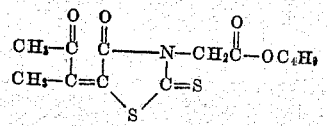

This compound was obtained in the same manner as described in Example 2(a) above, but heating for 20 hours instead of 5 hours. There were thus obtained 7.7 g. of product in the form of long, yellow needles, M. P. 58–59° C. from methanol.

*Example 4.—Methyl α-(3-carbomethoxymethyl-4-keto-2-thiothiazolid-5-ylidene) propionate*

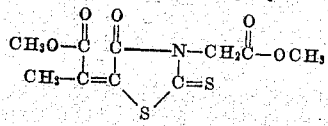

3-carboxymethylrhodanine (9.5 g.), pyruvic acid (5 cc.), methanol (35 cc.) and powdered, anhydrous zinc chloride (13.5 g.) were refluxed on a steam bath for 17 hours. Water (50 cc.) was added and the yellow oil which precipitated then solidified was recrystallized from isopropanol. It (7.4 g.) formed flat, yellow needles, M. P. 87–88° C.

*Example 5.—Ethyl α-(3-carbethoxymethyl-4-keto-2-thiothiazolid-5-ylidine)propionate*

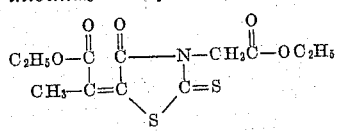

This compound was obtained in the same manner as that of Example 5, using ethanol (35 cc.) in place of methanol. It (6.75 g.) was obtained as yellow needles, M. P. 68° C. from isopropanol.

*Example 6.—N-butyl α-(3-carbo-n-butoxymethyl-4-keto-2-thiothiazolid-5-ylidene)propionate*

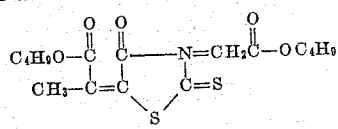

This compound was obtained in the same manner as that of Example 4, using n-butanol instead of methanol. It (6.2 g.) was obtained as soft yellow needles, M. P. 52° C. from methanol.

By replacing the 3-carboxymethylrhodanine of Example 4 by a molecularly equivalent amount of 3-ethylrhodanine, methyl α-(3-ethyl-4-keto-2-thiothiazolid-5-ylidene)propionate having the following formula:

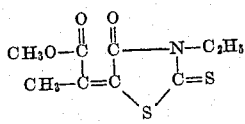

can be obtained.

The compounds of Formula I have been found to be particularly useful as desensitizers for photographic silver halide emulsions. They are also useful in the preparation of other organic compounds. For example, they can advantageously be used to prepare merocyanine dyes selected from those represented by the following general formula:

V.

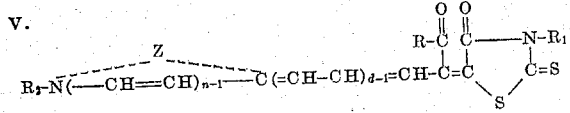

wherein R and $R_1$ each have the value given above, $R_2$ represents an alkyl group, such as methyl, ethyl, propyl, carbethoxymethyl, etc., $n$ and $d$ each represents a positive integer of from 1 to 2, and Z represent the nonmetallic atoms necessary to complete a heterocyclic nucleus containing from 5 to 6 atoms in the heterocyclic ring, e. g. a heterocyclic nucleus of the thiazole series, (e. g. thiazole, 4-methylthiazole, 4-phenylthiazole, 5-methylthiazole, 5-phenylthiazole, 4,5-dimethylthiazole, 4,5-diphenylthiazole, etc.), a heterocyclic nucleus of the benzothiazole series (e. g. benzothiazole, 4-chlorobenzothiazole, 5 - chlorobenzothiazole, 6 - chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5 - methoxybenzothiazole, 6 - methoxybenzothiazole, 6-iodobenzothiazole, 5-iodobenzothiazole, 4-ethoxybenzothiazole, 5-thoxybenzothiazole, 5,6-dimethoxybenzothiazole, 5-hydroxybenzothiazole, 6-hydroxybenzothiazole, etc.), a heterocyclic nucleus of the naphthothiazole series (e. g. α-naphthothiazole, β-naphthothiazole, 7-methoxy - α - naphthothiazole, 8 - methoxy - α - naphthothiazole, 5-methoxy-β-naphthothiazole, 5-ethoxy-α-naphthothiazole, etc.), a heterocyclic nucleus of the benzoselenazole series (e. g. benzoselenazole, 5-chlorobenzoselenazole, 6-methoxybenzoselenazole, 5- methoxybenzoselenazole, etc.), a heterocyclic nucleus of the naphthoselenazole series (e. g. α-naphthoselenazole, β-naphthoselenazole, etc.), a heterocyclic nucleus of the benzoxazole series (e. g. benzoxazole, 5-hydroxybenzoxazole, 6-hydroxybenzoxazole, 5-chlorobenzoxazole, 5-methoxybenzoxazole, 6-methoxybenzoxazole, 5-phenylbenzoxazole, 5-bromobenzoxazole, etc.), a heterocyclic nucleus of the naphthoxazole series (e. g. α-naphthoxazole, β-naphthoxazole, etc.), a heterocyclic nucleus of the 2-quinoline series (e. g. 2-quinoline, 6-methyl-2-quinoline, 7-methyl-2-quinoline, 8-methyl-2-quinoline, 6-chloro-2-quinoline, 8-chloro-2-quinoline, 4-chloro-2-quinoline, 5-ethoxy-2-quinoline, 6-ethoxy-2-quinoline, 7-ethoxy-2-quinoline, 6-hydroxy-2-quinoline, 7-hydroxy-2-quinoline, 6-methoxy-2-quinoline, etc.), a heterocyclic nucleus of the 4-quinoline series (e. g. 4-quinoline, 6-methoxy-4-quinoline, 7-methyl-4-quinoline, 8-methyl-4-quinoline, etc.), etc.

Advantageously, the merocyanine dyes selected from those represented by Formula IV can be prepared by condensing a compound selected from those represented by the following general formula:

V

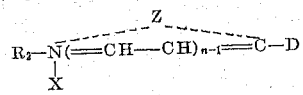

wherein $R_2$, $n$ and Z each have the values given above, X represents an acid radical, such as chloride, bromide, iodide, p-toluenesulfonate, benzenesulfonate, methylsulfate, ethylsulfate, etc., and D represents an alkylthio or arylthio group, i. e. the group having the formula:

Va 

wherein $R_3$ represents an alkyl group, such as methyl, ethyl, etc., or an aryl group, such as phenyl, tolyl, etc., or D can represent a β-aminovinyl group, such as:

Vb 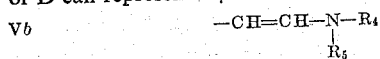

wherein $R_4$ represents an aryl group, such as phenyl, tolyl, etc., and $R_5$ represents an acyl group, such as acetyl, propionyl, benzoyl, etc., together with a compound selected from those represented by Formula I above. The condensations of the compounds of Formula V with those of Formula I above can advantageously be carried out in the presence of a basic condensing agent, such as the trialkylamines, (e. g. triethylamine, tripropylamine, triisopropylamine, tributylamine, etc.), the N,N-dialkylanilines (e. g. N,N-dimethylaniline, N,N-diethylaniline, etc.), the N-alkylpiperidines (N-methylpiperidine, N-ethylpiperidine, etc.), etc. Also, the condensations can be carried out in the presence of an inert diluent, such as ethanol, propanol, isopranol, 1,4-dioxan, diethyl ether, etc. Heat accelerates the condensations and temperatures varying from room temperature to the reflux temperature of the reaction mixture can be employed.

The following examples will serve to illustrate the method of preparing the compounds of IV according to my invention.

*Example 7.—3-carbethoxymethyl-5-[1-(3-ethylbenzothiazolin - 2 - ylidene)hex - 2 - en - 5 - on - 4 - ylidene] - 2 - thiothiazolid-4-one*

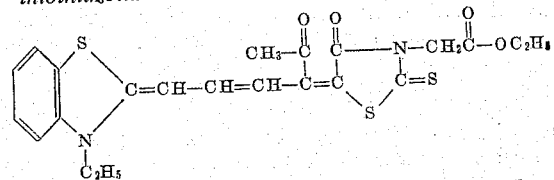

2,2'-acetanilidovinylbenzothiazole ethiodide (2.25 g.), compound of Example 1 (1.45 g.), ethanol (10 cc.) and triethylamine (0.8 cc.) were heated on a steam bath for 5 minutes. Ethanol (10 cc.) was added and the blue solution chilled and scratched. The dye (1.0 g., 42%) was collected after 3 days and obtained as a dark blue crystalline powder, M. P. 156° C., from benzene-ethanol.

*Example 8.—3 - carbethoxymethyl-5-[1-(3-ethylbenzothiazolin - 2 - ylidene)butan - 3 - on - 2 - ylidene] - 2 - thiothiazolid-4-one*

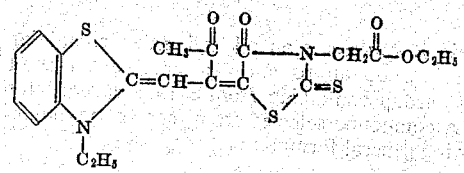

2-ethylthiobenzothiazole etho-p-toluenesulfonate (2.0 g.), compound of Example 1 (1.45 g.), ethanol (10 cc.) and triethylamine (0.8 cc.) were refluxed for 5 minutes. The dye separated from the hot solution. It (1.4 g., 62.5%) was obtained as blue needle rosettes, M. P. 195° C., from benzene.

*Example 9.—3-carbethoxymethyl-5-[1-(3-methylthiazolidin - 2 - ylidene)butan - 3 - on - 2 - ylidene] - 2 - thiothiazolid - 4 - one*

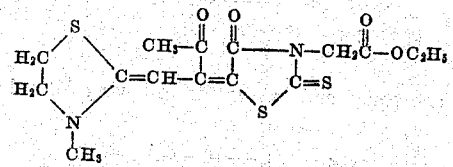

2-methylthiothiazoline metho-p-toluenesulfonate (1.0 g.), compound of Example 1. (0.9 g.), ethanol (10 cc.) and triethylamine (0.5 g.) were refluxed for 10 minutes. The dye (0.3 g., 25%) which separated on chilling formed rust-red needles, M. P. 181° C., from benzene.

*Example 10.—3-carbomethoxymethyl-5-[1-carbomethoxy-2-(3-methylthiazolidin-2 - ylidene)ethylidene] - 2 - thiothiazolid-4-one*

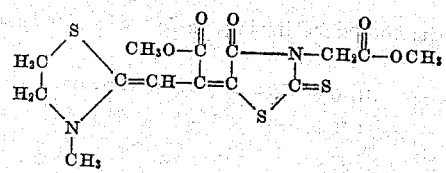

2-methylthiothiazoline metho-p-toluenesulfonate (1.6 g.), compound of Example 4 (1.45 g.), ethanol (10 cc.) and triethylamine (0.8 cc.) were refluxed for 10 minutes. The dye oiled out and crystallized slowly on chilling. It (1.0 g., 51.5%) formed red needles or steel-blue prisms, M. P. 178° C., from benzene-ethanol.

Compounds of Formula IV can also be used as desensitizers for photographic silver halide emulsions. Also, they can in turn be used to prepare complex merocyanine dyes by quaternization with an alkyl salt, followed by condensation with a compound containing a reactive methyl or methylene group.

The compounds of Formula I above can also be used to prepare complex merocyanine dyes represented by the following general formula:

VI

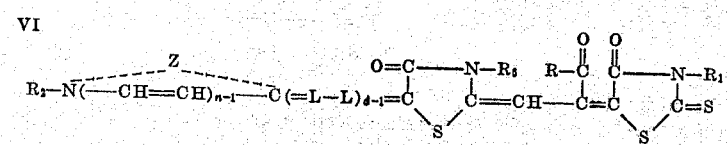

wherein R, $R_1$, $R_2$, $n$, $d$ and Z each have the values given above, L represents a methine group, i. e. $a = CR'$— group wherein R' represents a hydrogen atom, an alkyl group (i. e. methyl, ethyl, etc.), an aryl group (e. g. phenyl, etc.), or an acyl group or carbalkoxy group (i. e. R' has the same values as R), and $R_6$ represents an alkyl group, such as methyl, ethyl, propyl, butyl, carboxymethyl, carbethoxymethyl, allyl, benzyl, etc. The complex merocyanine dyes of VI above can advantageously be prepared by condensing together a compound selected from those represented by Formula I above with a compound selected from those represented by the following general formula:

VII

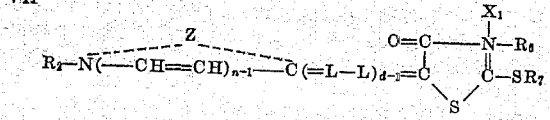

wherein $R_2$, $R_6$, $d$, $n$ and Z each have the values given above, $R_7$ represents an alkyl group, such as methyl, ethyl, etc., and $X_1$ represents an acid radical, such as those set forth above for X. The condensation of the compounds of Formula I with those of Formula VII can advantageously be carried out substantially as described above for the condensation of the compounds of Formula I with those of Formula V. The compounds of Formula VII above can advantageously be prepared by heating together a compound selected from those represented by the following general formula:

VIII

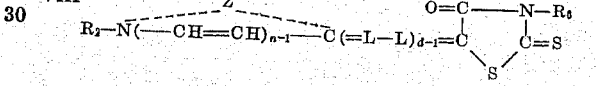

wherein $R_2$, $R_6$, $d$, $n$, L and Z each have the values given above with an alkyl salt selected from those represented by the following general formula:

IX

wherein $R_7$ and $X_1$ each have the values given above.

The following examples will serve to illustrate the method of preparation of the compounds of Formula VI above.

*Example 11.—2-[2-(3-carbethoxymethyl-4-keto-2-thiothiazolidin - 5-ylidene)butan-3-on-1-ylidene]-3-ethyl-5-(3-ethylbenzoxazolin - 2-ylidene-ethylidene)thiazolid-4-one*

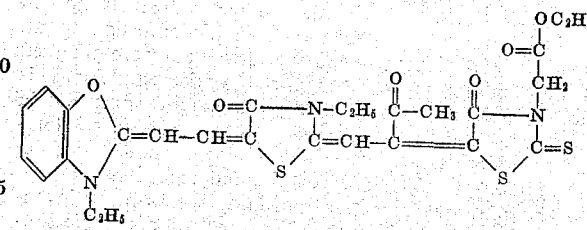

3-ethyl-5-(3-ethylbenzoxazolin-2-ylidene-ethylidene)-2-thiothiazolid-4-one (1.65 g.) and methyl p-toluenesulfonate (1.0 g.) were fused at 130° C. for 30 minutes in an oil bath. Compound of Example 1 (1.45 g.), ethanol (10 cc.) and triethylamine (0.8 cc.) were added and refluxed for 5 minutes. The precipitated dye (1.5 g., 49.5%) formed dull, green needles, M. P. 237° C., from pyridine-ethanol.

*Example 12.—3-allyl-2-[2-(3-carbethoxymethyl-4-keto-2-thiothiazolidin - 5 - ylidene)butan-3-on-1-ylidene]-5-[1-(3 - ethylbenzothiazolin - 2 - ylidene)but-2-ylidene]thiazolid-4-one*

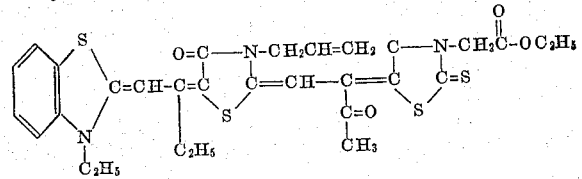

3-allyl-5- 1-(3-ethylbenzothiazolin-2-ylidene)but-2-ylidene -2-thiothiazolid-4-one (1.3 g.) and methyl p-toluenesulfonate (0.7 g.) were fused at 125° C. for 15 minutes. Compound of Example 1 (1.0 g.), ethanol (20 cc.) and triethylamine (0.5 cc.) were added and refluxed for 5 minutes. The dye (1.25 g., 58.5%) formed brown needles with a gold-reflex, M. P. 208° C., from pyridine-ethanol.

The compounds of Formula VI are also useful as desensitizers for photographic silver halide emulsions. The following table will serve to illustrate the desensitizing action of the compounds of Formulas I, IV and VI on photographic silver halide emulsions. The data were obtained from an ordinary photographic silver chlorobromide emulsion finished to a 10/i speed of 100 as shown in the table below. Corresponding measurements were made from the same batch of emulsion containing the compounds as identified in the table below and in the amounts set forth.

| Compound | g./1,000 g. equivalent AgNO$_3$ | 10/1 Speed |
|---|---|---|
| Blank | | 100 |
| 1 | 0.5 | 0.5 |
| 2 | 0.5 | 1.5 |
| 3 | 0.5 | 0.1 |
| 4 | 0.5 | 0.8 |
| 5 | 0.5 | 0.8 |
| 6 | 0.5 | 0.8 |
| 7 | 0.25 | 3.0 |
| 8 | 0.25 | 5.0 |
| 9 | 0.6 | 25.0 |
| 10 | 0.6 | 25.0 |
| 11 | 0.25 | 0.8 |
| 12 | 0.05 | 25.0 |

As shown in the above table, certain of the compounds of my invention have a marked desensitizing action in reducing the speed of a photographic emulsion to an extremely low level. While the above data were obtained using a photographic silver chlorobromide emulsion, it is to be understood that other photographic silver halide emulsions can be employed to advantage, e. g. gelatino-silver chloride, -chloroiodide, -chlorobromide, -iodide, -bromide, -bromiodide developing-out emulsions.

The emulsions prepared in accordance with my invention can be coated in the usual manner on a suitable support, e. g. glass, cellulose nitrate film, cellulose acetate film, polyvinylacetal resin film, paper or metal.

What I claim as my invention and desire secured by Letters Patent of the United States is:

1. A compound selected from those represented by the following general formula:

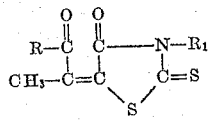

wherein R represents a member selected from the group consisting of a methyl group and an alkoxyl group containing from 1 to 4 carbon atoms and R$_1$ represents a member selected from the group consisting of an alkyl group of the formula C$_n$H$_{2n+1}$ wherein $n$ represents a positive integer of from 1 to 4, a carbalkoxymethyl group containing from 3 to 6 carbon atoms, a carboxymethyl group, an allyl group, and a benzyl group.

2. A compound selected from those represented by the following general formula:

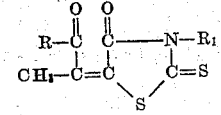

wherein R represents an alkoxyl group containing from 1 to 4 carbon atoms and R$_1$ represents a carbalkoxy methyl group containing from 3 to 6 carbon atoms.

3. A compound selected from those represented by the following general formula:

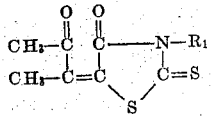

wherein R$_1$ represents a carbalkoxy methyl group containing from 3 to 6 carbon atoms.

4. The compound having the following formula:

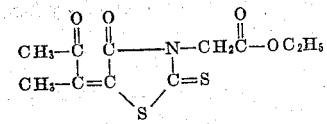

5. The compound having the following formula:

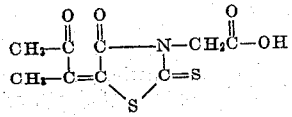

6. The compound having the following formula:

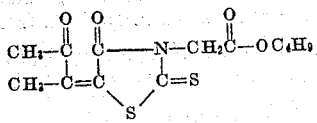

7. The compound having the following formula:

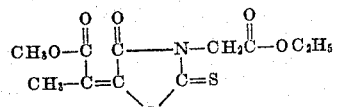

8. The compound having the following formula:

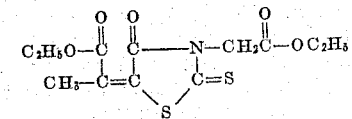

9. A process for preparing new compounds comprising heating together a compound selected from those represented by the following general formula:

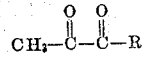

wherein R represents a member selected from the group consisting of a methyl group, a hydroxyl group and an alkoxyl group containing from 1 to 4 carbon atoms with a compound selected from those represented by the following general formula:

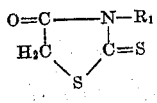

wherein R$_1$ represents a member selected from the group consisting of an alkyl group of the formula C$_n$H$_{2n+1}$ wherein $n$ represents a positive integer of from 1 to 4, a carbalkoxymethyl group containing from 3 to 6 carbon atoms, a carboxymethyl group, an allyl group, and a benzyl group in the presence of zinc chloride under substantially anhydrous conditions.

10. A process for preparing new compounds comprising heating diacetyl together with a compound selected from those represented by the following general formula:

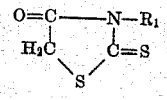

wherein $R_1$ represents a carbalkoxy methyl group containing from 3 to 6 carbon atoms in the presence of zinc chloride under substantially anhydrous conditions.

11. A process for preparing new compounds comprising heating pyruvic acid together with a compound selected from those represented by the following general formula:

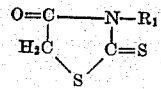

wherein $R_1$ represents a carbalkoxy methyl group containing from 3 to 6 carbon atoms in the presence of zinc chloride and an alcohol under substantially anhydrous conditions.

References Cited in the file of this patent

UNITED STATES PATENTS

| | | |
|---|---|---|
| 2,170,807 | Brooker | Aug. 29, 1939 |
| 2,177,402 | Brooker | Oct. 24, 1939 |
| 2,245,361 | Pinkney | June 10, 1941 |
| 2,255,903 | Shonle | Sept. 16, 1941 |